US012726690B2

(12) United States Patent
Alonso Oliva et al.

(10) Patent No.: US 12,726,690 B2
(45) Date of Patent: Sep. 1, 2026

(54) CAMERA WITH OVERMOLDED BODY AND ELECTRONIC SHIELDING

(71) Applicant: Ficosa Adas, S.L.U., Barcelona (ES)

(72) Inventors: Daniel Alonso Oliva, Barcelona (ES); Enrique Osorio, Barcelona (ES); Jesus Mendez Villamide, Barcelona (ES)

(73) Assignee: FICOSA ADAS, S.L.U., Barcelona (ES)

( * ) Notice: Subject to any disclaimer, the term of this patent is extended or adjusted under 35 U.S.C. 154(b) by 106 days.

(21) Appl. No.: 18/526,323

(22) Filed: Dec. 1, 2023

(65) Prior Publication Data

US 2024/0187714 A1 Jun. 6, 2024

(30) Foreign Application Priority Data

Dec. 1, 2022 (EP) .................................... 22383170

(51) Int. Cl.
*H04N 23/52* (2023.01)
*H04N 23/54* (2023.01)

(52) U.S. Cl.
CPC ............. *H04N 23/52* (2023.01); *H04N 23/54* (2023.01)

(58) Field of Classification Search
CPC ........ H04N 23/52; H04N 23/54; H04N 23/55; H04N 23/57; H04N 23/50; H04N 23/51; B29C 45/14344; B29C 45/14639; B29C 2045/14459; G03B 17/55
See application file for complete search history.

(56) References Cited

U.S. PATENT DOCUMENTS

| | | | | |
|---|---|---|---|---|
| 10,142,532 | B2 * | 11/2018 | Mleczko | B29C 45/77 |
| 2009/0128684 | A1 * | 5/2009 | Apel | H10F 39/804 348/360 |
| 2012/0155854 | A1 * | 6/2012 | Huang | H10F 39/011 29/592.1 |
| 2013/0222596 | A1 * | 8/2013 | Han | H04N 23/54 348/148 |
| 2014/0132768 | A1 * | 5/2014 | Choi | G03B 17/08 348/148 |
| 2015/0168813 | A1 * | 6/2015 | Lang | H04N 23/51 348/148 |
| 2015/0205186 | A1 * | 7/2015 | Park | G02B 7/026 348/373 |
| 2017/0295306 | A1 * | 10/2017 | Mleczko | B29C 45/77 |
| 2018/0054555 | A1 * | 2/2018 | Kunze | G08G 1/165 |
| 2018/0210161 | A1 * | 7/2018 | Park | G03B 17/55 |
| 2018/0295262 | A1 * | 10/2018 | Dellock | G03B 17/02 |
| 2019/0356828 | A1 * | 11/2019 | Mleczko | H04N 23/55 |

(Continued)

FOREIGN PATENT DOCUMENTS

| | | | | |
|---|---|---|---|---|
| WO | WO-2019009611 A1 * | 1/2019 | | H04N 23/51 |

OTHER PUBLICATIONS

Extended European Search Report dated May 12, 2023 for European Patent Application No. 22383170.2, 9 pages.

*Primary Examiner* — Padma Haliyur
(74) *Attorney, Agent, or Firm* — Brooks Kushman P.C.

(57) ABSTRACT

The camera arrangement comprises an electronics carrier, an imager connected to the electronics carrier, a lens assembly in optical communication with the image sensor along an optical axis, an outer shell, wherein the outer shell is injection-molded over and around the electronics carrier such that the electronics carrier is substantially encapsulated within the outer shell.

15 Claims, 3 Drawing Sheets

(56) References Cited

U.S. PATENT DOCUMENTS

2019/0381952 A1* 12/2019 Wang .................... G02B 7/02
2019/0386413 A1* 12/2019 Conger .................. H01R 27/02
2020/0145560 A1* 5/2020 Han .................... G03B 17/08
2020/0225561 A1* 7/2020 Alonso Oliva ........ G03B 17/08
2021/0122299 A1* 4/2021 Garcia .................. B60R 11/04
2022/0039908 A1* 2/2022 Okajima ................ A61B 46/20
2022/0155418 A1* 5/2022 Han .................... H04N 23/51

* cited by examiner

O
100
160
165
190
140
130
120
200
110
210

O
100
160
150
141
165
190
140
120
150
110
200
142
210

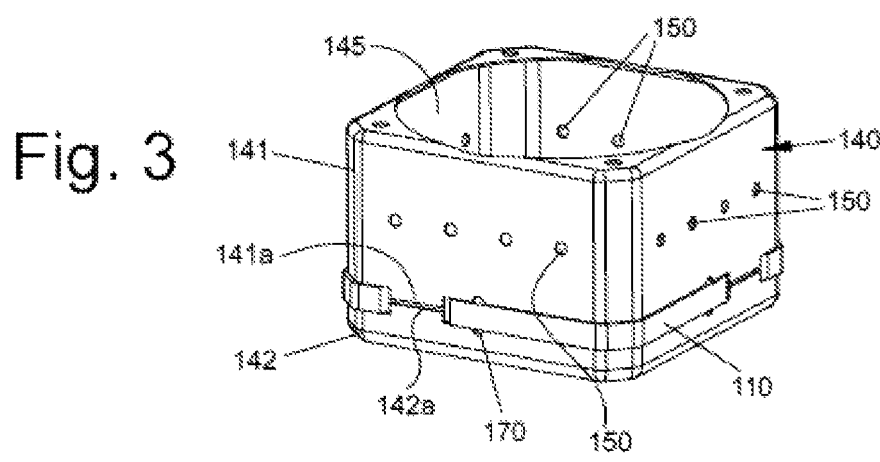
Fig. 3
145
150
141
140
150
141a
142
142a
170
150
110
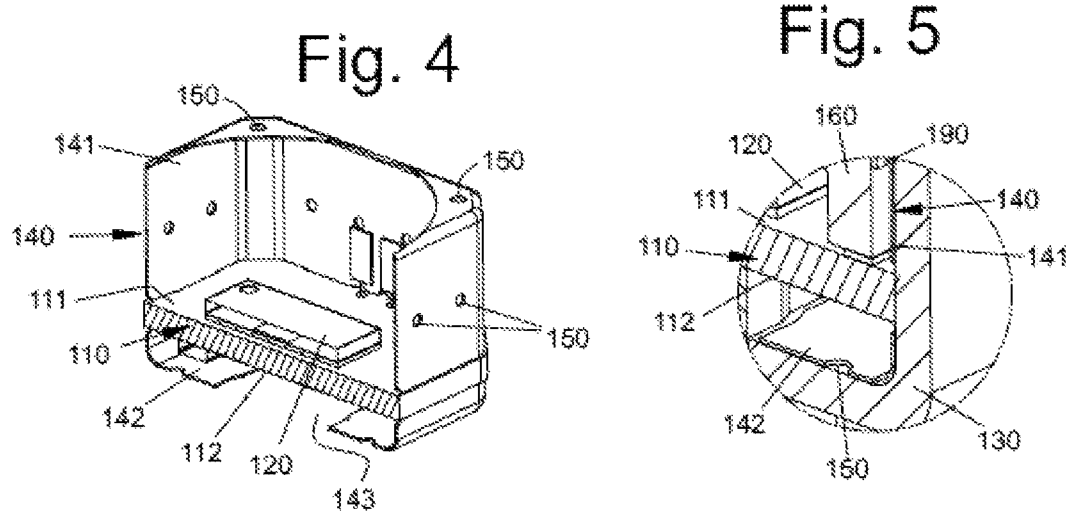
Fig. 4
150
141
150
140
111
110
150
142
112
120
143
Fig. 5
160
120
190
111
140
110
141
112
142
150
130
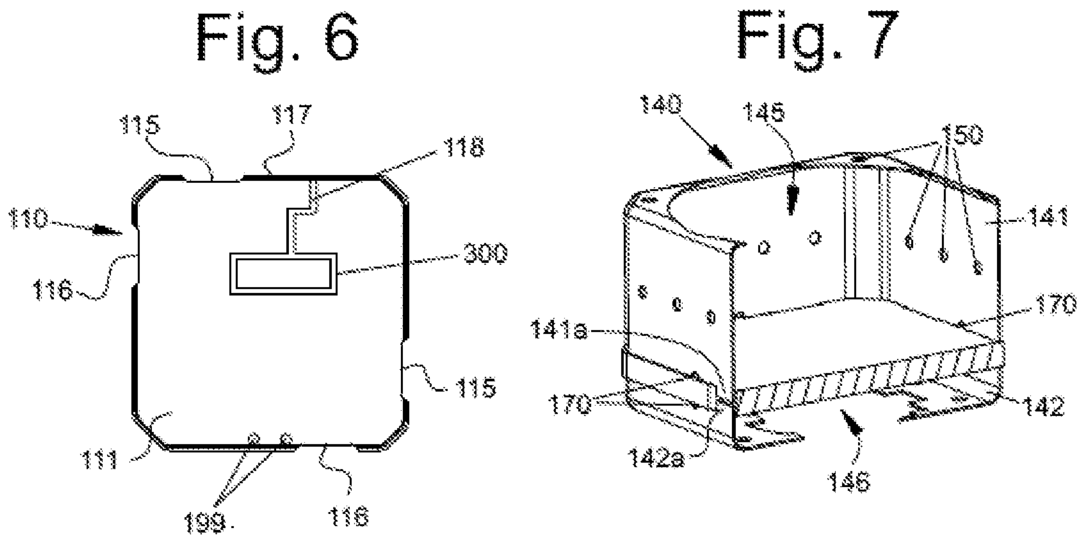
Fig. 6
115
117
118
110
300
116
115
111
199
116
Fig. 7
140
145
150
141
170
141a
170
142
142a
146

CAMERA WITH OVERMOLDED BODY AND ELECTRONIC SHIELDING

CROSS-REFERENCE TO RELATED APPLICATIONS

This application claims priority to EP application Serial No. 22383170.2 filed Dec. 1, 2022, the disclosure of which is hereby incorporated in its entirety by reference herein.

TECHNICAL FIELD

The present disclosure relates to camera arrangements suitable but not exclusively for motor vehicles.

BACKGROUND

Vision devices are increasingly installed in motor vehicles as part of advanced driver assistance systems (ADAS). Vision devices may be embodied as digital rear view mirrors, for example camera monitoring systems (CMS), including a display for displaying an exterior image of the vehicle. Some vision devices may include camera arrangements comprising a front camera module, a back camera module, and/or camera modules for providing front-views, rear-views, surrounding views, top-views, bird's eye views, in-cabin views, etc. Vision systems may also contain object detection and warning systems, and vehicle trajectory prediction mechanisms. Vision devices may be part of autonomous motor vehicles.

In particular, vision devices include, for example, a video camera module, a controller or electronic control unit (ECU), a display of the Liquid Crystal Display (LCD), LED (Light-Emitting Diode), OLED Organic Light-Emitting Diode (OLED) type. For digital rear view mirrors applications, the camera module is usually fitted in the motor vehicle that facing outward for capturing images. Images captured by the camera module are displayed on a display screen in real time, with a little delay and/or stored in a suitable memory.

Camera modules include a housing and at least one electronics carrier having at least one printed circuit board (PCB) that is received within the housing and an image sensor or imager that is connected to the PCB.

Attachment of the electronics carrier to the housing is usually carried out via screws. The use of screws is time consuming and in practice it may give rise to problems particularly in automated assembling through robots. In addition, the use of screws requires thick housing walls for the screws to pass through which results in more material required so costs and weight are increased.

Another problem in current camera arrangements is low heat dissipation resulting from air within the housing.

So far, prior art camera modules have not been able to successfully deal with the problem of electromagnetic waves reaching electrical elements, such as an imaging device. In current camera modules, the electronics carriers include a conductor loop with self-inductance that causes a magnetic field inherent to any current that is produced when a step voltage change is applied to loop input terminals. Voltage is initially generated by the loop that is proportional to the change in the magnetic flux. This prevents the current from following the voltage step immediately. Voltage transient duration depends on a loop area. Induction can be used to delay current change which is known to cause undesirable electromagnetic fields.

An improved camera arrangement is still required and capable of overcoming the above-mentioned drawbacks while providing advantageous solutions to the shortcomings in the prior art.

SUMMARY

It is thus at least one object of the present disclosure to provide a camera arrangement with enhance properties of heat dissipation. Further, it is at least another object of the present invention to reduce or remove the electromagnetic influence of the camera arrangement.

A camera arrangement is disclosed herein with which it has been found that at least the above disadvantages in the prior art solutions are mitigated. The present camera arrangement may be in particular a camera module and specifically a camera module for a motor vehicle. Many other different applications are not ruled out.

The present camera arrangement comprises an electronics carrier. The electronics carrier is suitable for carrying electronics for operation of the camera arrangement. The electronics carrier may comprise one or more printed circuit boards (PCBs) and optionally any other substrate having electronics. Each printed circuit board has two main surfaces, i.e., a first surface and a second surface connected through an edge.

An image sensor or imager is connected to, i.e., arranged on, attached to, or coupled to one of the main surfaces of the PCB, in optical communication with a lens assembly which will be described further below. The image sensor serves the purpose of converting electromagnetic radiation, i.e., light, into an image signal. It may be preferred that the image sensor may have a resolution equal to or higher than 1 megapixel.

As stated above, a lens assembly is provided comprising a lens body with one or more lenses. More in particular, the lens assembly may comprise a lens barrel adapted for receiving a number of optical elements arranged one after the other along the direction of an optical axis which will be defined below. The lens assembly is particularly configured for guiding the light into the image sensor. For this purpose, the lens assembly and the image sensor are in optical communication, that is, the lens assembly and the image sensor are optically aligned and define the optical axis. The lens assembly may further comprise at least one flange embedded within the outer shell projecting radially outwards from the lens assembly perpendicular to the optical axis. The purpose of the flange will be described below.

The lens assembly defines a straight line passing through its geometrical center that creates a path along which the light is propagated through the lenses. The straight line will be hereinafter referred to as optical axis which is an imaginary line that defines the path along which light propagates through the assembly. The lens assembly is thus in in optical communication with the image sensor along the optical axis.

A mechanical axis or axis of rotational symmetry is defined during assembly by a straight line passing through its geometrical center. If lenses in the lens assembly system have curved surfaces, the mechanical axis passes through the center of curvature of each curved surfaces of the lenses. The optical axis is an imaginary line that defines the path along which light propagates through the system.

When the optical axis is coincident with the mechanical axis, the system is considered an on-axis optical system. The lens assembly is thus in optical communication with the image sensor along the optical axis.

In use, the lens assembly and the electronics carrier may be attached to each other, that is, the lens assembly may be attached to the electronics carrier or the electronics carrier may be attached to the lens assembly. In fact, at least one positioning portion may be provided for attaching the lens assembly and the electronics carrier to each other. Attachment of the lens assembly and the electronics carrier to each other may be such that both elements are in direct or indirect contact with each other depending on specific requirements. For example, attachment of the lens assembly and the electronics carrier to each other may be carried out via an adhesive mechanism.

The present camera arrangement further comprises an outer shell. The outer shell is a one-single injection-molded part such that the electronics carrier is substantially encapsulated within the outer shell. The outer shell may be over and around the electronics carrier. The outer shell may or may not contact the electronics carrier. It may be preferred that the outer shell may contact the edge of the PCB. More preferably, the outer shell may contact a portion of the first surface and/or a second surface of the electronics carrier. Also, the outer shell may surround at least one portion of a connector or adapter. The connector will be described further below. Preferably, the outer shell may contact at least one portion of an outer surface of the connector or adapter. The material of the outer shell may be one or more of a polyamide material, a polymeric material, a thermoplastic material, a synthetic material, a resin, rubber.

A conductive electro-magnetic interference (EMI) shielding is also provided. Within the meaning of the present disclosure, EMI is known to adversely affect electronic devices causing disturbances, data losses, system failures, etc. EMI-shielding, thus refers the effect of creating a barrier for preventing electromagnetic fields from interfering with electronic devices.

The conductive EMI-shielding in the present camera arrangement is substantially encapsulated within the outer shell. The conductive EMI-shielding is made of any electrically conductive material, for example, metal, such as aluminum or any non-ferrous alloy material comprising aluminum such as Zamak although other materials are possible. It is preferred that the conductive EMI-shielding may comprise an electrically conductive sheet, i.e., metal sheet.

On the one hand, with the described configuration, the conductive EMI-shielding encapsulated within the outer shell acts as a Faraday cage that creates a barrier between the internal components of the camera arrangements and the external environment, against electromagnetic radiation from external electric fields.

On the other hand, the metal EMI-shielding allows an improved heat dissipation. Heat dissipation results in optical misalignments between the lens and the image sensor being prevented. This is advantageous since the misalignments are a major issue in current camera arrangements whose resolution is increasingly higher.

The conductive EMI-shielding includes a cavity for receiving the image sensor and at least one portion of the electronics carrier. The cavity in the conductive EMI-shielding may be also suitable for receiving at least one portion of the lens assembly.

The conductive EMI-shielding may further comprise one or a number of passageways. The passageways are intended for molding material of the outer shell to be allowed to flow through into the conductive EMI-shielding during an injection molding process to form a one-single over molded unit. During the injection molding process, molding material of the outer shell flows through the passageways of the EMI-shielding at least partially filling the interior of the EMI-shielding. The molding material may be in direct contact to at least an inner surface of the EMI-shielding and a main surface of the electronics carrier. It allows a good heat dissipation.

The passageways may be of any shape and geometry, such as, for example, tubular. A cross-sectional area of the passageways may be 0.7-12 mm$^2$, with 0.8-8 mm$^2$ being preferred. The values for the size of the passageways are large enough for ensuring a suitable flow rate of outer shell molding material through the passageways, that is, for ensuring the molding material to properly flow into the conductive EMI-shielding, filling the interior thereof within a suitable time, and small enough so that electromagnetic radiation does not escape through the passageways, thus keeping a good effectiveness of the Faraday cage. The values for the size of the passageways have been found to be advantageous for a low-pressure injection process of the molding material of the outer shell with pressure values lower than 60 bar to form the outer shell of the camera arrangement, such as 3-40 bar, 3-30 bar, 5-20 bar, with 5-15 bar being most preferred. These pressure values characterizing the low-pressure injection process to form a one-single over molded unit have been shown to be suitable for not damaging the electronic components. An optimal balance is thus achieved between the number of passageways required and their specific size together with the above-mentioned injection pressure values.

The conductive EMI-shielding and the electronics carrier may be attached to each other, preferably, through an attaching mechanism. The attaching mechanism may comprise soldering material or an adhesive mechanism. The adhesive mechanism may be glue, preferably, the glue includes electrically conductive particles. Whether providing soldering material or adhesive mechanism (e.g., conductive or non-conductive glue), an electronic component coupled to the electronics carrier may be electrically connected to the conductive EMI-shielding.

It is preferred that the conductive EMI-shielding may include a lateral surface that, in turn, may include at least one opening. That is, one or more openings may be formed on a lateral surface of the conductive EMI-shielding. The opening may be intended for receiving soldering material so as to attach the conductive EMI-shielding to the electronics carrier. Other ways of soldering the conductive EMI-shielding and the electronics carrier to each other are of course not ruled out.

The conductive EMI-shielding may comprise a first part and a second part. The first part of the conductive EMI-shielding may be arranged in the lens assembly. The first part of the conductive EMI-shielding and the lens assembly may be formed of a single part, i.e., metal coating, or a metal barrel, fitted in the lens assembly. It is preferred that the lens barrel of the lens assembly comprises the metal coating or a metal sheet. In that case, the lens assembly may be soldered to the electronics carrier or glued, for example, through a metal glue. This is, the lens assembly and the electronics carrier may be attached to each other through an attaching mechanism, being the attaching mechanism, soldering material or adhesive mechanism. The adhesive mechanism may be glue, preferably, the glue includes electrically conductive particles. In this way, the lens assembly may act as the first part of the conductive EMI-shielding.

The first part and the second part of the conductive EMI-shielding may be electrically connected to each other. The camera arrangement may comprise an electric line configured to electrically connect the first part and the second part to each other. The electric line and the conductive EMI-shielding may be attached to each other, for example, by welding material. Preferably, the conductive EMI-shielding may comprise the electric line. That is, the electric line may be a part of or be attached to the conductive EMI-shielding. More preferably, the first part and/or the second part the conductive EMI-shielding may comprise the electric line.

As stated above, the electronics carrier may comprise a first surface where the image sensor may be connected to and a second surface opposite the first surface. The electronics carrier may further comprise a first interface portion (i.e., an electrically conductive pad) formed on the first surface. A second interface portion is preferably formed on the second surface.

It is preferred that the camera arrangement may further comprise a first conductive track and/or a second conductive track. Preferably, the first conductive track and/or second conductive track is/are associated with the electronics carrier. More preferably, the first surface of the electronics carrier may comprise the first conductive track. It is even more preferred that the second surface of the electronics carrier may also comprise the second conductive track. The first conductive track may electrically connect at least one electronic component to the first interface portion. The second conductive track may electrically connect at least one electronic component to the second interface portion. In use, the first part of the conductive EMI-shielding may be electrically connected to the electronics carrier through at least the first interface portion, and the second part of the conductive EMI-shielding may be electrically connected to the electronics carrier through at least the second interface portion. In use, as disclosed above, the second part may be electrically connected to the first part of the conductive EMI-shielding by an electric line.

The electronics carrier may comprise an opening through which the electric line is allowed to at least partially pass. At least prior to the conductive EMI-shielding is substantially encapsulated within the outer shell, a gap may be defined between the first part and the second part of the conductive EMI-shielding. The welding material may be provided to bridge the gap so as to electrically connect the first part and the second part of the conductive EMI-shielding to each other.

Preferably, the first part and the second part of the conductive EMI-shielding may include corresponding first and/or second projections extending along the optical axis or parallel thereto. The first and/or second projections may be configured to be at least partially inserted into the above-mentioned opening formed in the electronics carrier. The electric line may comprise the first and/or second projections.

At least prior to the conductive EMI-shielding is substantially encapsulated within the outer shell, a gap may be defined between at least:

(i) the first projection and the second part of the conductive EMI-shielding; or (ii) the second projection and the first part of the conductive EMI-shielding.

It may be preferred that the first part may comprise the first projection and the second part may comprise the second projection. Both first and second projections may be configured to be at least partially inserted into the above-mentioned opening formed in the electronics carrier. At least prior to the conductive EMI-shielding is substantially encapsulated within the outer shell, a gap may be defined between the first and second projection.

The opening(s) formed in the electronics carrier may be or may comprise at least one of indentation(s), aperture(s), notch(es), cut(s), groove(s), and slot(s). The opening may be formed on an edge of the electronics carrier. The at least one projection running through the opening may prevent the conductive EMI-shielding from being rotated with respect to the electronics carrier during assembly process. If the opening is a notch on the edge of the electronics carrier, it has the advantage of providing the welding material more easily.

The first part of the conductive EMI-shielding may be in electrical contact with one surface of the electronics carrier. At least one electronic component in the surface of the electronics carrier may be in electrical contact with the first part through a first conductive track. Preferably, the first conductive track may be formed in or near a perimetric edge of the electronics carrier. The second part may be in electrical contact with the other surface of the electronics carrier through a corresponding second conductive track. The first and second conductive tracks may extend from at least one electronic component to corresponding first and second interface portions formed on the respective opposite surfaces of the electronics carrier. The interface portions may be formed in or near the edge of the electronics carrier. Near the edge of the electronics carrier has a meaning within the purpose of the present disclosure of between 0-30% of the length between edges of the electronics carrier.

As stated above, the lateral surface of the conductive EMI-shielding may comprise one or more openings. The openings are intended for receiving soldering material so as to attach the first part of the conductive EMI-shielding to the first surface of the electronics carrier; and/or to attach the second part of the conductive EMI-shielding to the second surface of the electronics carrier.

The electronics carrier may be configured to split the conductive EMI-shielding in at least a first cavity and a second cavity prior to the conductive EMI-shielding is substantially encapsulated within the outer shell. The first cavity may comprise the image sensor and at least a portion of the lens assembly. The second cavity may comprise the connector or the adapter. Further, the electronics carrier may be substantially perpendicular to the optical axis. Once the conductive EMI-shielding is substantially encapsulated within the outer shell, the molded material may be completely filled in the second cavity, and at least partially filled in the first cavity. In use, the molded material of the first cavity may directly contact at least on the inner surface of the conductive EMI-shielding and a main surface of the electronics carrier without preventing the optical communication between the lens assembly and the image sensor. The molded material of the second cavity may directly contact at least on the inner surface of the second part of the conductive EMI-shielding and the other main surface of the electronics carrier.

As stated above, the electronics carrier may further comprise an edge connecting the first and second main surface. The molded material may directly contact the edge of the electronics carrier and the outer surface of the conductive EMI-shielding. Also, the molded material may directly contact a portion of an outer surface of the connector or the adapter. Further, the outer shell may be injection-molded over and around a portion of the first surface and/or a second surface of the electronics carrier.

The present camera arrangement may further comprise a heater element for resistive heating of the lens assembly. The heater element may comprise a sheet material with electrical resistance configured to be arranged at least partially surrounding the lens assembly wrapping an outer side surface thereof. The purpose of the heater element is converting electrical energy into thermal energy for heating the lens assembly as an electric current flows there through. As a result, a defrosting effect is provided, as well as removal of obstacles and any water-based obstructions that may be attached to the lens assembly, which may result in undesired optical contamination.

The heater element may preferably comprise a thin film, foil, or sheet material with electrical resistance. The thin film, foil, or sheet material of which the heater element may preferably be made of a malleable nature such that it can be easily bent. The thin film, foil, or sheet material is electrically conductive so as to act as a Joule effect heater. In use, at least a portion of the outer surface of the heater element may be in direct contact to the molding material. The inner surface of the heater element may be in direct contact to the outer surface of the lens barrel or the adhesive mechanism.

As described above, the lens assembly may comprise at least one flange embedded within the outer shell projecting radially outwards from the lens assembly perpendicular to the optical axis. The flange may be circular at least partially covering the perimeter of the lens assembly defining an annular flat surface to serve as a guide for the positioning of the heater element.

A method for making a camera arrangement is also provided. The method comprises inserting the electronics carrier and at least a portion of the lens assembly inside an injection mold, injecting outer shell molding material such as, for example, one or more of a polyamide material, a polymeric material, a thermoplastic material, a synthetic material, a resin, rubber, to form the outer shell. The outer shell may be a one-single injection-molded part such that the electronics carrier is substantially encapsulated within the outer shell and removing the injection mold. It may be preferred that the outer shell may at least partially surround the electronics carrier and at least partially a portion of the lens assembly so as to form a one-single over molded unit.

The step of injecting outer shell molding material is a low-pressure injection process that involves pressure values up to 60 bar to form the outer shell. Preferred ranges of pressure values are 3-40 bar, 3-30 bar, 5-20 bar, 7-15 bar, with 5-15 bar being most preferred.

The method may further comprise providing the conductive EMI-shielding with at least one the passageway such that injection causes the molding material to flow there through into the conductive EMI-shielding.

The method may further comprise connecting the image sensor to the electronics carrier and attaching the lens assembly and the electronics carrier to each other so as to establish an optical communication between the lens assembly and the image sensor. Therefore, the step of causing the molding material to flow into the conductive EMI-shielding through the at least one passageway is such that the molding material is not interfering with the optical communication.

The method may further comprise at least partially inserting the lens assembly in the conductive EMI-shielding. The lens assembly may be received through a cutout formed in the first part of the EMI-shielding. In particular, the first part of the conductive EMI-shielding may be first attached to the electronics carrier and then the lens assembly is mounted, or the lens assembly may be first attached to the electronics carrier and then the first part of the conductive EMI-shielding is mounted.

The conductive EMI-shielding may be electrically connected to the electronics carrier by electrically connecting the first part of the conductive EMI-shielding with one surface of the electronics carrier in order to minimize undesirable electromagnetic effects. Also, connection of the conductive EMI-shielding to the electronics carrier may be performed by electrically connecting the second part of the conductive EMI-shielding with the other surface of the electronics carrier. For this, a soldering step may be performed by providing soldering material so as to attach the electronics carrier and the first part and/or the second part of the conductive EMI-shielding to each other.

The method may further comprise attaching the heater element on a side surface of the lens assembly. In particular, the heater element may be wrapped around the lens assembly such that an inner surface of the heater element is attached to an outer side surface of the lens assembly. This is, the inner surface of the heater element may be in direct contact to the outer surface of the lens barrel or the adhesive mechanism adapted to attach the heater element to the lens barrel. In use, at least a portion of the outer surface of the heater element may be in direct contact to the molding material.

Shielding projections in the first and second parts of the conductive EMI-shielding may be at least partially inserted into corresponding openings, such as indentations, apertures, notches, cuts, grooves, or slots that may be formed in an edge of the electronics carrier, such that first and second projections of the conductive EMI-shielding may be substantially aligned along or parallel with the optical axis.

First and second conductive tracks may be formed extending from at least one electronic component to first and second electrically conductive interface portions defined in opposite surfaces of the electronics carrier.

A welding step may be performed providing welding material into a gap defined between shielding projections of the first and second parts of the conductive EMI-shielding for electrical connection to each other.

A step of electrically connecting a connector to the electronics carrier may be performed. This may be performed by at least partially inserting the connector in the conductive EMI-shielding. The connector may be received through a cutout formed in the second part of the EMI-shielding. The connector may be provided with at least one pin, and preferably a plurality of pins. An adapter may be provided to be connected to the connector.

The method may further comprise curing the molding material before removing the injection mold.

A demolding step may be performed. In such step, the mold may be removed with the lens assembly, attached or not to the electronics carrier, being a one-single over-molded unit.

In any case, after demolding, the molding material remains surrounding at least one portion of the lens assembly and completely the electronics carrier.

BRIEF DESCRIPTION OF THE DRAWINGS

Non-limiting examples of the present disclosure will be described in the following, with reference to the appended drawings.

In the drawings:

FIG. 3 is a perspective view of the EMI-shielding attached to electronics carrier;

FIGS. 4 and 7 are cross-sectional views of the EMI-shielding in FIG. 3 from different angles;

FIG. 5 is a cross-sectional part view of a detailed portion of the camera arrangement showing the EMI-shielding and the outer shell;

FIG. 6 is a top view of the electronics carrier showing one main surface thereof;

DETAILED DESCRIPTION

Figure 1:
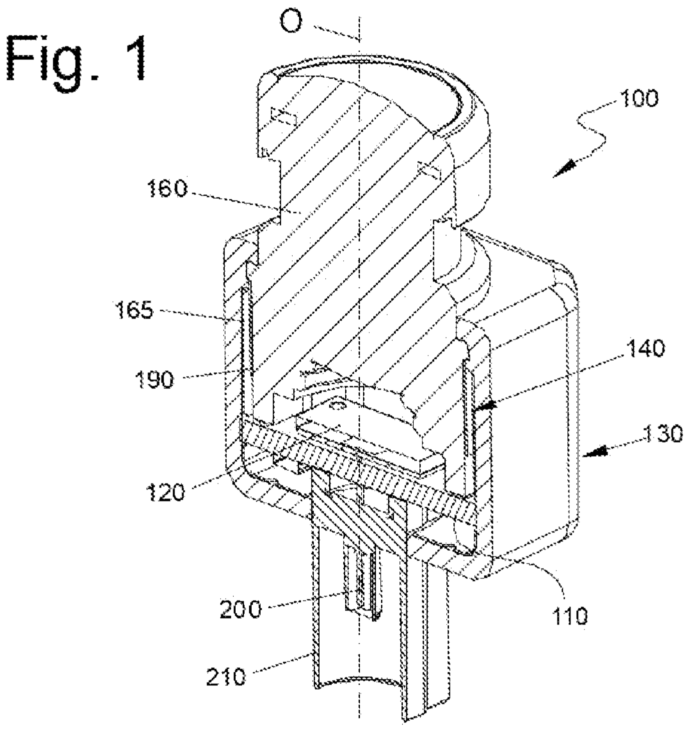
FIG. 1 is a perspective sectional view of one example of the present camera arrangement.

In the examples in FIGS. 1-9 of the drawings, a camera module 100 is shown which in this specific case is a camera module 100 for a motor vehicle, such as for example a front camera module or a back camera module. Reference will thus be made in the following to a camera module 100. The camera module 100 may of course be used for many other applications than motor vehicles.

The camera module 100 herein described comprises an electronics carrier 110 carrying electronics required for connecting electronic components 300, as shown in FIG. 6, for the operation of the camera module 100. In this example, the electronics carrier 110 comprises a printed circuit board (PCB). Further PCBs and substrates having electronics may be included in the electronics carrier 110. Reference will be made hereafter to the PCB 110 to refer to the electronics carrier. The PCB has a first main surface 111 and a second main surface 112 arranged parallel to each other. The PCB has also an edge connecting the first and second main surfaces 111, 112.

An image sensor or imager 120 is provided for converting electromagnetic radiation, i.e., light, into an image signal. The image sensor 120 is connected to, i.e., arranged on, attached to, or coupled to, one of the first and second main surfaces 111, 112 of the PCB 110, in optical communication with a lens assembly 160. The lens assembly 160 comprises a lens body with one or more lenses, in particular, a lens barrel adapted for receiving a number of optical elements arranged one after the other along the direction of an optical axis O which will be defined below.

Figure 2:
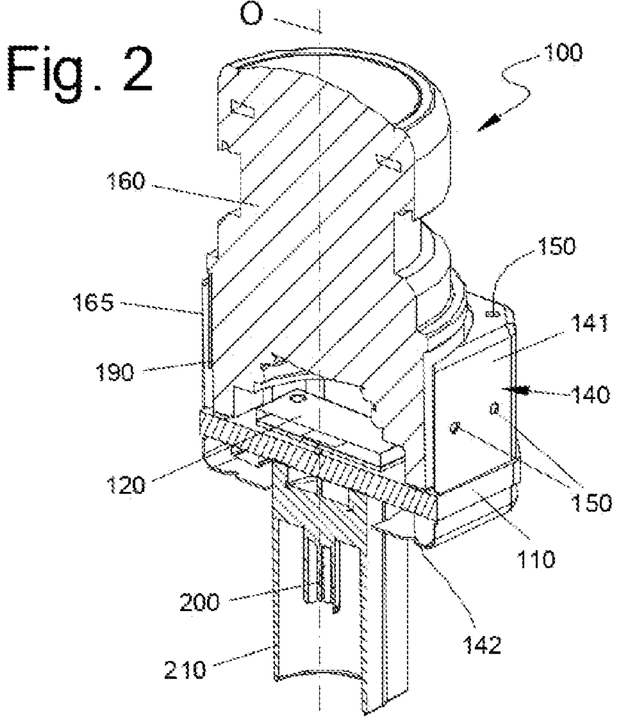
FIG. 2 is a perspective sectional view of the example of the camera arrangement shown in FIG. 1 without the outer shell to illustrate the EMI-shielding.

The lens assembly 160 is configured for guiding the light into the image sensor 120. For this purpose, the lens assembly 160 and the image sensor 120 are in optical communication, that is, they are optically aligned and define the optical axis O. The optical axis O is illustrated in FIGS. 1 and 2. As shown, the optical axis O of the camera module 100 is defined along a straight line passing through a geometrical center of the lens assembly 160 that creates a path along which the light is propagated through the lenses of the lens assembly 160. If the lenses have curved surfaces, the optical axis O passes through the center of curvature of each curved surfaces of the lenses. The lens assembly 160 is thus in optical communication with the image sensor 120 along the optical axis O.

In use, the lens assembly 160 and the PCB 110 are attached to each other. This may be carried out by attaching the lens assembly 160 to the PCB 110 or by attaching the PCB 110 to the lens assembly 160. In fact, at least one positioning portion is provided for attaching the lens assembly 160 and the PCB 110 to each other. Attachment of the lens assembly 160 and the PCB 110 to each other may be such that both elements are in direct or indirect contact with each other depending on specific requirements. For example, attachment of the lens assembly 160 and the electronics carrier 110 to each other may be carried out through adhesive mechanism.

Figure 8:
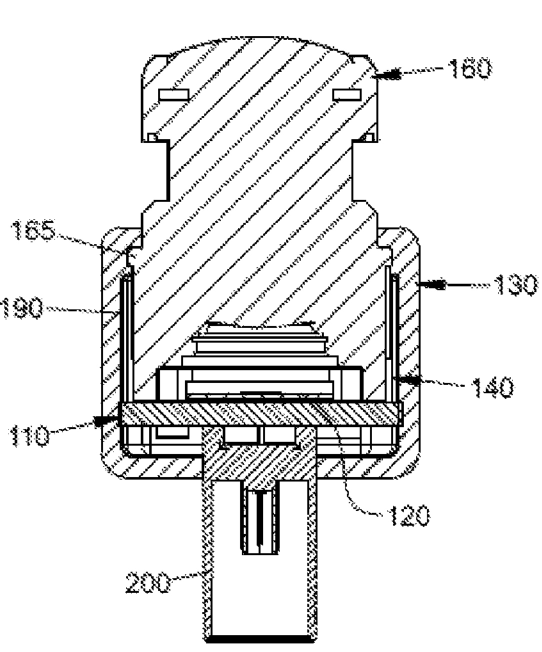
FIG. 8 is an elevational sectional view of the camera arrangement.

The present camera module 100 further comprises an outer shell 130 as shown in FIGS. 1 and 8. The outer shell 130 of the camera module 100 is a one-single injection-molded part. As a result, the PCB 110 is encapsulated within the outer shell 130. The material of the outer shell 130 may be one or more of a polyamide material, a polymeric material, a thermoplastic material, a synthetic material, a resin, rubber. Other suitable materials are possible. As shown, the outer shell 130 directly contacts an outer surface of a conductive EMI-shielding 140. Also, the outer shell 130 directly contacts an outer surface of an adapter or a connector 200. In particular, the outer shell 130 is injection-molded over and around the PCB 110. For example, the outer shell 130 directly contacts the edge of the PCB 110.

The lens assembly 160 may further comprise at least one flange 165 embedded within the outer shell 130 projecting radially outwards from the lens assembly 160 perpendicular to the optical axis O, as illustrated in FIGS. 1, 2, 8. The purpose of the flange 165 will be described further below.

A conductive EMI-shielding 140 is also provided as shown in FIG. 2, and more in detail in FIGS. 3-5 and 7-9 of the drawings. The conductive EMI-shielding 140 in the present camera module 100 is substantially encapsulated within the outer shell 130. The conductive EMI-shielding 140 is made of metal, such as aluminum. Any non-ferrous alloy material comprising aluminum such as Zamak may be used. The conductive EMI-shielding 140 acts as a Faraday cage that creates a barrier between the internal components (i.e., electronic components 300) of the camera module 100 and the external environment.

The conductive EMI-shielding 140 creates a barrier against electromagnetic interference (EMI). EMI adversely affects electronic devices causing system failures. The EMI-shielding 140 prevents electromagnetic fields from interfering with internal components of the camera module 100. Furthermore, the conductive EMI-shielding 140 provides improved heat dissipation resulting in optical misalignments between the lens assembly 160 and the image sensor 120 being prevented.

As shown in FIG. 3, a cavity 145 is formed in the conductive EMI-shielding 140 for suitably receiving the image sensor 120, the PCB 110, and the lens assembly 160.

FIGS. 3, 4, 7, 9 show in detail the conductive EMI-shielding 140 including a number of passageways 150. The passageways 150 are configured as openings formed through the walls of the conductive EMI-shielding 140 for allowing molding material of the outer shell 130 to smoothly flow there through into the interior of conductive EMI-shielding 140 during an injection molding process to form a one-single over molded unit. During the injection molding process, molding material of the outer shell 130 flows through the above-mentioned passageways 150 of the conductive EMI-shielding 140 at least partially filling the interior of the EMI-shielding 140.

The passageways 150 are designed such that the molding material to form the outer shell 130 is allowed to pass through into the conductive EMI-shielding 140 without the molding material reaching the image sensor 120. As a result, required optical communication between the optical lenses of the lens assembly 160 and the image sensor 120 is not interrupted by the molding material injected through the passageways 150 into the conductive EMI-shielding 140.

In the example shown in FIGS. 3, 4, 7, 9, the passageways 150 are cylindrical in shape although any tubular shape may be used as long as it is suitable for the flow of outer shell molding material into the conductive EMI-shielding 140 during an injection molding process. The passageways 150 in the example described have a preferred cross-sectional area of 0.8-8 $mm^2$. More in particular, the diameter of the passageways 150 is of between 1 to 3 mm. Every passageway 150 of the EMI-shielding 140 may have the same cross-sectional area or only some passageways 150 of the EMI-shielding 140 may have the same cross-sectional area.

The injection molding process for forming the outer shell 130 encapsulating the conductive EMI-shielding 140 is a low-pressure injection process involving pressure values lower than 40 bar, such as, for example, 5-15 bar.

As shown in the figures, the conductive EMI-shielding 140 comprises a first part 141 and a second part 142 electrically connected to each other. An electric line 144 is provided to electrically connect the first part 141 and the second part 142 of the conductive EMI-shielding 140 to each other. The electric line 144 is attached to the conductive EMI-shielding 140 by welding material W.

As shown in FIGS. 3, 6 and 7, the PCB 110 comprises an opening 115, 116 which is, in particular, a notch at the edge thereof. The electric line 144 at least partially runs through the opening 115, 116. Further, the electric line 144 comprises the first and/or second projections 141*a*, 142*a* extending along the optical axis (O) or parallel thereof. In particular, the conductive EMI-shielding 140 is provided with the first and/or second projections 141*a*, 142*a*. More in particular, the first part 141 of the conductive EMI-shielding is provided with the first projection 141*a* and/or the second part 142 of the conductive EMI-shielding is provided with the second projection 142*a*.

A gap is defined between at least one of:

(i) the first projection 141*a* and the second part 142 of the conductive EMI-shielding 140; and (ii) the second projection 142*a* and the first part 141 of the conductive EMI-shielding 140.

In particular, as shown in FIGS. 1 to 8, the gap is defined between the first and second projections 141*a*, 142*a* of the first and second parts 141, 142 of the EMI-shielding 140.

The gap is adapted for receiving welding material W to physically attach and electrically connect the first and second parts 141, 142 of the conductive EMI-shielding 140 to each other. The gap is particularly small sized, for example, less than 4 millimeters. It is to be noted that once welding material W has been supplied, no gap is present. The welding material W is provided at least prior to the conductive EMI-shielding 140 is substantially encapsulated within the outer shell 130.

The opening 115 also acts to prevent the conductive EMI-shielding 140 from being rotated with respect to the PCB 110 during assembly process. The opening 115 at the PCB edge thus allows assembly process to be easier, especially regarding the welding step when providing the welding material W.

As stated above, the first and second parts 141, 142 of the conductive EMI-shielding 140 have corresponding first and second projections 141*a*, 142*a* extending along the optical axis O or parallel thereto, as shown in detail FIG. 7 of the drawings. The first and second projections 141*a*, 142*a* are configured to be at least partially inserted into the opening 115, 116 formed in the respective opposite surfaces 111, 112 of the PCB 110, as shown in FIG. 6. As a result, the first and second projections 141*a*, 142*a* of the EMI-shielding 140 are at least substantially aligned along or parallel with the optical axis O. The openings 115, 116 may be or comprise apertures, notches, cuts, grooves, or slots formed in an edge of the PCB 110. However, the apertures, notches, cuts, grooves, or slots may be formed in any portion of the surfaces 111, 112 of the PCB 110 such as in a middle portion thereof. Optionally although not necessary, the first projection 141*a* of the first part 141 of the conductive EMI-shielding 140 is aligned with the second projection 142*a* of the second part 142 of the conductive EMI-shielding 140 along or parallel with the optical axis O.

The first part 141 of the conductive EMI-shielding 140 is in electrical contact with the first main surface 111 of the PCB 110. At least one electronic component 300 in the main surface 111 of the PCB 110 is in electrical contact with the first part 141 of the conductive EMI-shielding 140 through a first conductive track 118 formed in or near a perimetric edge of both main surfaces 111, 112 of the PCB 110 as shown in FIG. 6 of the drawings. The second part 142 of the conductive EMI-shielding 140 is in electrical contact with the second main surface 112 of the PCB 110 which is in turn in electrical contact with the second part 142 of the conductive EMI-shielding 140 through a corresponding second conductive track 118. The first and second conductive tracks 118 extend from the at least one electronic component 300 to corresponding first and second interface portions 117 formed on the respective first and second main surfaces 111, 112 of the PCB 110 as shown in FIG. 6.

Figure 9:
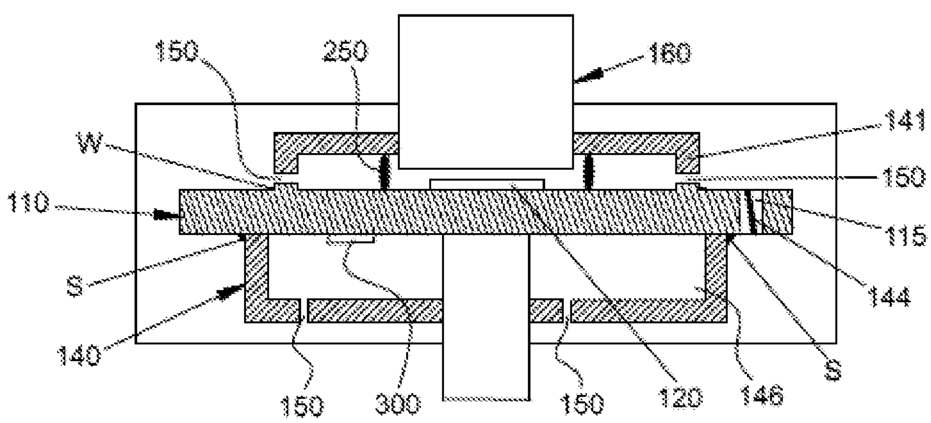
FIG. 9 is a cross-sectional view of the camera arrangement.

The above-mentioned lens assembly 160 comprises a lens barrel for receiving optical lenses, not shown, and may include the first part 141 of the conductive EMI-shielding 140, as shown in FIG. 9. This is, the first part 141 of the conductive EMI-shielding 140 may be a part of or be attached to the lens assembly 160. The first part 141 of the conductive EMI-shielding 140 may be either a conductive coating or it may include a metal sheet.

The conductive EMI-shielding 140 is attached to the PCB 110 by an attaching mechanism, for example, by soldering S such that the conductive EMI-shielding 140 is fixed to the PCB 110 as long as electrical connection is provided between an electronic component 300 and the conductive EMI-shielding 140. If the lens assembly 160 includes the first part 141 (not shown), the attaching mechanism comprises the adhesive mechanism (e.g., glue). The first and second parts 141, 142 of the EMI-shielding 140 are connected to corresponding electronic components 300 provided on the first and second surfaces 111, 112 of the PCB 110. This results in an effective Faraday cage being obtained.

It is to be noted that the electrical connection between the electronic component 300 and the conductive EMI-shielding 140 does not necessary occur through the attaching mechanism. The attaching mechanism may be soldering material S or any suitable adhesive mechanism. The adhesive mechanism may be electrically conductive glue.

A lateral surface of the conductive EMI-shielding 140 has openings 170, as shown in FIG. 3. The openings 170 allow soldering material to be received therein to attach the first and second parts 141, 142 of the EMI-shielding 140 to the respective first and second main surfaces 111, 112 of the PCB 110.

It is to be noted that at least two different attaching mechanisms are employed according to an example. At least a first attaching mechanism comprising soldering material S for attaching the conductive EMI-shielding 140 and the PCB 110, and a second attaching mechanism comprises welding material W provided for attaching the first and second parts 141, 142 of the conductive EMI-shielding 140 to each other, for example, through the provided projections 141*a*, 142*a*, as shown in FIG. 7.

As shown in the figures, the PCB 110 is configured to split the conductive EMI-shielding 140 in at least a first cavity 145 and a second cavity 146 prior to the conductive EMI-shielding 140 is substantially encapsulated within the outer shell 130. The first cavity 145 comprises the image sensor 120 and at least a portion of the lens assembly 160. The second cavity 146 comprises the connector 200 or the adapter. Further, the PCB 110 is substantially perpendicular to the optical axis (O). Once the conductive EMI-shielding 140 is substantially encapsulated within the outer shell 130, the molded material is completely filled in the second cavity 146, and partially filled in the first cavity 145. In use, the molded material of the first cavity 145 directly contacts at least on the inner surface of the first part 141 of the conductive EMI-shielding 140 and the first surface 111 of the PCB. More in particular, the molded material of the first cavity 145 directly contacts, the lens assembly 160, for example, the lens barrel. The molded material of the second cavity 146 directly contacts at least on the inner surface of the second part 142 of the conductive EMI-shielding and the second surface 112 of the PCB. Also, the molded material of the second cavity 146 directly contacts the outer surface of the connector 200 or the adapter.

As described above, the lens assembly 160 may comprise at least one flange 165 embedded within the outer shell 130 projecting radially outwards from the lens assembly 160 perpendicular to the optical axis O as shown in FIGS. 1 and 2. The flange 165 may at least partially cover the perimeter of the lens assembly 160 defining an annular flat surface to serve as a guide for the positioning of the heater element 190. The flange 165 may also provide stability during the injection molding process.

FIG. 9 shows the outer shell 130 is injection-molded over and around the PCB 110. The PCB 110 and the conductive EMI-shielding 140 are attached to each other. The PCB 110 and at least a portion of the lens assembly 160 are encapsulated within the outer shell 130. Further, FIG. 9 illustrates the lens assembly 160 comprising the first part 141 of the conductive EMI-shielding 140. This is, the first part 141 of the conductive EMI-shielding 140 is a part of or attached to the lens assembly 160. The lens assembly 160 and the PCB 110 are attached to each other by the above-mentioned attaching mechanism, for example, the adhesive mechanism. Alternatively, the attaching mechanism is welding material (W). Further, a sealing mechanism 250 is provided between the main surface 111 of the PCB 110 and the conductive EMI-shielding 140. Particularly, as shown, the sealing mechanism 250 is provided between the first main surface 111 of the PCB 110 and the first part 141 of the conductive EMI-shielding 140. The molded material that flows through the above-mentioned passageways 150 of the conductive EMI-shielding 140 at least directly contacts the inner surface of the EMI-shielding 140, the first surface 111 of the PCB 110 and the sealing mechanism 250. Therefore, the molded material does not interfere with the optical communication between the lens assembly 160 and the image sensor 120. As shown in FIG. 9, the opening 115 is not a notch on an edge of the PCB 110 as shown in FIGS. 1-8 but an aperture 115 formed in the middle portion of the PCB 110. The opening 115 allows an electrical communication between the first main surface 111 and the second main surface 112 through the electric line 144. For example, the electric line 144 is configured to electrically connect, directly or indirectly, the first and second 141, 142 parts of the conductive EMI-shielding 140. At least an electric track (not shown) is configured to electrically connect the electronic component 300 to the conductive EMI-shielding 140. In particular, the lens assembly 160 is electrically connected to an electronic element, the electronic element is electrically connected to the electric line 144 through at least the first electric track. The second part 142 of the conductive EMI-shielding 140 is electrically connected to the electronic component 300, the electronic component 300 is electrically connected to the electric line 144 through at least the second electric track (not shown). In this way, the electronic element, the electronic component 300, the first part 141 and the second part 142 of the conductive EMI-shielding 140 are electrically connected to each other.

Referring now to FIGS. 1, 2, 8, a heater element 190 is also provided in the example shown. The heater element 190 is adapted for resistive heating of the lens assembly 160. The heater element 190 comprises a sheet material with electrical resistance configured to be arranged at least partially surrounding the lens assembly 160 wrapping an outer side surface thereof. The heater element 190 is capable of converting electrical energy into thermal energy for heating the lens assembly 160 as an electric current flows there through. In use, a defrosting effect is provided, as well as removal of obstacles and any water-based obstructions that may be attached to the lens assembly 160, which may result in undesired optical contamination.

The heater element 190 is formed with a malleable, electrically conductive thin film, foil, or sheet material with electrical resistance that can be easily bent. The thin film, foil, or sheet material is 0.2-0.3 mm thick, such as 0.22 mm thick and malleability is such that it can advantageously assume a bending radius of about 10 mm for a lens assembly 160 being 19.3 mm in diameter.

The heater element 190 may be arranged preferably at least partially surrounding the lens assembly 160, wrapping an outer side surface thereof. The heater element 190 may be arranged wound more than one turn around the outer side surface of the lens assembly 160 so that, in use, an overlapping portion is defined by two opposite edges of the sheet material of the heater element 190. Thus, in practice, the heater element 190 is adhered to and closes the perimeter of the lens assembly 160 by overlapping two ends of the heater foil. The overlapping portion ensures that the thin film, foil, or sheet material does not come loose and is strongly adhered to the lens assembly 160.

The heater element 190 is attached to an outer side surface of the lens assembly 160 preferably in direct contact thereto. An adhesive mechanism may be applied on at least one of the outer side surface of the lens assembly 160 and an inner surface of the thin film, foil, or sheet material of the heater element 190. In use, the outer surface of the heater element 190 is in direct contact to the molding material. The inner surface of the heater element 190 is in direct contact to the outer surface of the lens barrel or the adhesive mechanism. Advantageously, the molding material improves attachment between the heater element 190 to the lens barrel. It results in improved heating efficiency.

The thin film, foil, or sheet material is flat before being applied to the lens assembly 160. During assembling process, the thin film, foil, or sheet material of the heater element 190 is bent in such a way that the inner side of the foil contacts the outer side surface of the lens assembly 160. The flat nature of the heater element 190 configured as a thin film, foil, or sheet material allows it to be applied surrounding the lens assembly 160. High efficiency in heating of the lens assembly 160 is provided as no gaps exist between the heat source and the object to be heated. Heat supplied to the lens assembly 160 is therefore not transferred directly to the PCB 110 so that buckling or bending of the PCB 110 is prevented to a large extent as a result of which imager-lens alignment is ensured.

The thin film, foil, or sheet material of the heater element 190 is electrically connected a power source (not shown). In examples, the power source is part of or attach to the camera arrangement 100. In examples, the power source is not part of or attach to the camera arrangement 100. In any case, the camera arrangement 100 further comprises a heater conductor mechanism (not shown) so as to electrically connect the thin film, foil, or sheet material of the heater element 190 to the power source. In particular, the heater element 190 comprises the heater conductor mechanism. As shown in FIG. 6, the PCB 110 further comprises a passage 199 where the heater conductor mechanism goes through. Particularly, the PCB 110 further comprises two passages 199 where the heater conductor mechanism goes through. The heater conductor mechanism may be an electric cable, in particular, includes two electric cables, wherein each electric cable goes through each passage 199.

A method for making the above-described camera module 100 is also provided herein. The method comprises inserting the PCB 110 and at least a portion of the lens assembly 160 inside an injection mold. A molding material such as, for example, one or more of a polyamide material, a polymeric material, a thermoplastic material, a synthetic material, a resin, rubber, is injected to form the outer shell 130 such that it surrounds at least partially a portion of the lens assembly 160 so as to form a one-single over molded unit.

As stated above, the step of injecting molding material to form the outer shell 130 is a low-pressure injection process that involves pressure values up to 60 bar to form the outer shell 130. Preferred ranges of pressure values are 3-40 bar, 3-30 bar, 5-20 bar, 7-15 bar, with 5-15 bar being most preferred.

The method may further comprise providing the conductive EMI-shielding 140 with at least one the passageway 150 as described above such that the injection process causes the molding material to flow there through into the injection mold.

The method may further comprise connecting the image sensor 120 to the PCB 110 and attaching the lens assembly 160 and the PCB 110 to each other so as to establish an optical communication between the lens assembly 160 and the image sensor 120.

The conductive EMI-shielding 140 may be electrically connected to the PCB 110 by electrically connecting the first part 141 of the conductive EMI-shielding 140 with one surface of the PCB 110 in order to minimize undesirable electromagnetic effects. However, connection of the conductive EMI-shielding 140 to the PCB 110 may be alternatively performed by electrically connecting the second part 142 of the conductive EMI-shielding 140 with the other surface of the PCB 110.

The method may further comprise attaching the heater element 190 on a side surface of the lens assembly 160. In particular, the heater element 190 may be wrapped around the lens assembly 160 such that an inner surface of the heater element 190 is attached to an outer side surface of the lens assembly 160.

The method may further comprise at least partially inserting the lens assembly 160 in the conductive EMI-shielding 140. The lens assembly 160 may be received through a cutout formed in the first part 141 of the EMI-shielding. In particular, the first part 141 of the conductive EMI-shielding 140 may be first attached to the electronics carrier 110 and then the lens assembly 160 is mounted, or the lens assembly 160 may be first attached to the electronics carrier 110 and then the first part 141 of the conductive EMI-shielding 140 is mounted.

Shielding projections 140 formed in the first and second parts of the conductive EMI-shielding 140 may be at least partially inserted into corresponding openings 115, 116 formed in the first and second main surfaces 111, 112, of the PCB 110 as shown in FIG. 7. This results in the first and second projections 141*a*, 142*a* of the first and second parts 141, 142 of the conductive EMI-shielding 140 being aligned along the optical axis O or parallel thereto.

A step of forming first and second conductive tracks 118 extending from at least one electronic component 300 to first and second electrically conductive interface portions 117 defined in opposite surfaces of the PCB 110 may be also performed.

Providing the attaching mechanism for attaching the conductive EMI-shielding 140 and the PCB 110 to each other as long as the electrical connection between the conductive EMI-shielding 140 and the PCB 110 is ensured. For example, a soldering step of the first part of the conductive EMI-shielding 140 and the PCB 110 to each other may be also performed. It may include applying suitable soldering material S between the conductive EMI-shielding 140 and the PCB 110.

Also, an attaching step of the first and/or second parts 141, 142 of the conductive EMI-shielding 140 to the first and/or second surfaces 111, 112 of the PCB 110 may be performed, for example, by soldering. In particular, providing soldering material to the at least one opening 170 of the conductive EMI-shielding 140. In this way, the first part 141 of the conductive EMI-shielding 140 is fixed to the first surface 111 of the PCB 110, wherein the electronics component 300 and the first part 141 are electrically connected, for example, through at least the first interface portion 117. Further, the second part 142 of the conductive EMI-shielding 140 is fixed to the second surface of the PCB 110, wherein an electronics element and the second part 142 are electrically connected, for example, through at least the second interface portion.

A connector 200, as shown in FIGS. 1, 2, 8, having at least one connector pin 210, as shown in FIGS. 1 and 2 of the drawings, may be received through a cutout 143 formed in the second part 142 of the EMI-shielding 140 as shown in FIG. 4. In use, the connector 200 is electrically connected to the PCB 110. An adapter, not shown, may be connected to the connector 200 by being received by at least one cutout formed therein.

The method may further comprise curing the molding material of the outer shell 130 before removing the injection mold.

A demolding step may be performed one the injection process has been completed. In such demolding step, the mold may be removed with the lens assembly 160, attached to the PCB 110 as a one-single over-molded unit. After demolding, the molding material of the outer shell 130 surrounds at least one portion of the lens assembly 160. In particular, the outer shell surrounds the edge of the PCB 110. Also, the outer shell 130 surrounds at least one portion of the connector 200.

A number of examples of a camera arrangement have been disclosed herein. However, other alternatives, modifications, uses and/or equivalents of the examples described are possible. All possible combinations of the examples described herein are also thus covered. The scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

For reasons of completeness, various aspects of the present disclosure are set out in the following numbered clauses:

Clause 1. A camera arrangement (100) comprising an electronics carrier (110), an image sensor (120) connected to the electronics carrier (110), a lens assembly (160) in optical communication with the image sensor (120) along an optical axis (O), and an outer shell (130), wherein the outer shell (130) is injection-molded over and around the electronics carrier (110) such that the electronics carrier (110) is substantially encapsulated within the outer shell (130);

wherein the camera arrangement further comprises a conductive EMI-shielding (140) substantially encapsulated within the outer shell (130);

wherein the conductive EMI-shielding (140) comprises at least one passageway (150) through which molding material of the outer shell (130) is allowed to flow into the conductive EMI-shielding (140) during an injection molding process; and preferably a surface area of the passageway (150) is 0.7-12 $mm^2$.

Clause 2. A camera arrangement (100) comprising an electronics carrier (110), an image sensor (120) connected to the electronics carrier (110), a lens assembly (160) in optical communication with the image sensor (120) along an optical axis (O), and an outer shell (130), wherein the outer shell (130) is injection-molded over and around the electronics carrier (110) such that the electronics carrier (110) is substantially encapsulated within the outer shell (130);

wherein the camera arrangement further comprises a conductive EMI-shielding (140) substantially encapsulated within the outer shell (130);

wherein the conductive EMI-shielding (140) and the electronics carrier (110) are attached to each other, preferably, by soldering material (S);

wherein the conductive EMI-shielding (140) comprises a first part (141) and a second part (142);

wherein the camera arrangement (100) comprises an electric line (144) configured to electrically connect the first part (141) and the second part (142) to each other; and wherein the electric line (144) and the conductive EMI-shielding (140) are attached to each other, preferably, by welding material (W).

Clause 3. A camera arrangement (100) comprising an electronics carrier (110), an image sensor (120) connected to the electronics carrier (110), a lens assembly (160) in optical communication with the image sensor (120) along an optical axis (O), and an outer shell (130), wherein the outer shell (130) is injection-molded over and around the electronics carrier (110) such that the electronics carrier (110) is substantially encapsulated within the outer shell (130); wherein the camera arrangement further comprises a conductive EMI-shielding (140) substantially encapsulated within the outer shell (130);

wherein the conductive EMI-shielding (140) comprises a first part (141) and a second part (142);

wherein the electronics carrier (110) comprises an opening (115, 116);

wherein the first part (141) of the conductive EMI-shielding (140) is provided with the first projection (141*a*) and/or the second part (142) of the conductive EMI-shielding (140) is provided with the second projection (142*a*) extending along the optical axis (O) or parallel thereof and configured to be at least partially inserted into the opening (115, 116) formed in the electronics carrier (110);

wherein a gap is defined, at least prior to the conductive EMI-shielding (140) is substantially encapsulated within the outer shell (130), between at least one of:

i) the first projection (141*a*) and the second part (142) of the conductive EMI-shielding (140); and ii) the second projection (142*a*) and the first part (141) of the conductive EMI-shielding (140);

wherein a welding material (W) is provided in the gap such that, in use, the first projection (141*a*) and the second part (142) of the conductive EMI-shielding (140) and/or the second projection (142*a*) and the first part (141) of the conductive EMI-shielding (140) are electrically connected.

Clause 4. A camera arrangement (100) comprising an electronics carrier (110), an image sensor (120) connected to the electronics carrier (110), a lens assembly (160) in optical communication with the image sensor (120) along an optical axis (O), and an outer shell (130), wherein the outer shell (130) is injection-molded over and around the electronics carrier (110) such that the electronics carrier (110) is substantially encapsulated within the outer shell (130);

wherein the camera arrangement (100) further comprises:

at least one positioning portion for attaching the lens assembly (160) and the electronics carrier (110) to each other;

a heater element (190) for resistive heating of the lens assembly (160), the heater element (190) comprising a sheet material with electrical resistance configured to be arranged at least partially surrounding the lens assembly (160) wrapping an outer side surface thereof for removing any water-based obstructions that may be attached to the lens assembly (160) as an electric current flows there through.

Clause 5. The camera arrangement (100) of clause 4, wherein it further comprises a conductive EMI-shielding (140) substantially encapsulated within the outer shell (130).

Clause 6. The camera arrangement (100) of clause 4, wherein the conductive EMI-shielding (140) comprises at least one passageway (150) through which molding material of the outer shell (130) is allowed to flow into the conductive EMI-shielding (140) during an injection molding process.

Clause 7. The camera arrangement (100) of clause 6, wherein a cross-sectional area of the passageway (150) is 0.7-12 $mm^2$.

Clause 8. The camera arrangement (100) of any preceding clause 1, 3, 4, 5, 6, 7, wherein the conductive EMI-shielding (140) and the electronics carrier (110) are attached to each other by soldering material (S) or adhesive mechanism.

Clause 9. The camera arrangement (100) of any preceding clause, wherein the conductive EMI-shielding (140) comprises a first part (141) and a second part (142); wherein the camera arrangement (100) comprises an electric line (144) configured to electrically connect the first part (141) and the second part (142) to each other.

Clause 10. The camera arrangement (100) of clause 2 or 9, wherein the electric line (144) and the conductive EMI-shielding (140) are attached to each other by mechanism of welding material (W).

Clause 11. The camera arrangement (100) of any preceding clause wherein the electronics carrier (110) comprises a first surface (111) where the image sensor (120) is connected and a second surface (112) opposite the first surface (111).

Clause 12. The camera arrangement (100) of clause 11, wherein the electronics carrier (110) further comprises a first interface portion (117) formed on the first surface (111) and a second interface portion (117) formed on the second surface (112).

Clause 13. The camera arrangement (100) of clause 2, 3 or 9-12, wherein it further comprises a first conductive track (118) electrically connecting at least one electronic component (300) to the first interface portion (117), and a second conductive track (118) electrically connecting at least one electronic component (300) to the second interface portion (117), such that, in use, the second part (142) is electrically connected to the first part (141) of the conductive EMI-shielding (140), the first part (141) of the conductive EMI-shielding (140) being electrically connected to the electronics carrier (110) through at least the first interface portion (117), and the second part (142) of the conductive EMI-shielding (140) being electrically connected to the electronics carrier (110) through at least the second interface portion (117).

Clause 14. The camera arrangement (100) of any of preceding clause, wherein the electronics carrier (110) is arranged to split the conductive EMI-shielding (140) in at least a first cavity and a second cavity prior to the conductive EMI-shielding (140) is substantially encapsulated within the outer shell (130), wherein the first cavity comprises the image sensor (120) and at least a portion of the lens assembly (160), and the second cavity comprises the connector (200) or the adapter.

Clause 15. The camera arrangement (100) of clause 14, wherein the second cavity is completely filled with the molded material and the first cavity is partially filled with the molded material.

Clause 16. The camera arrangement (100) of any preceding clause, wherein the electronics carrier (110) further comprises an edge connecting the first and second main surface (111, 112), wherein the molded material directly contacts the edge of the electronics carrier and the outer surface of the conductive EMI-shielding (140).

Clause 17. The camera arrangement (100) of any preceding clause, wherein the electronics carrier (110) comprises an opening (115, 116) where the electric line (144) at least partially runs through the opening (115, 116).

Clause 18. The camera arrangement (100) of clause 17, wherein the opening (115, 116) is or comprises at least one of indentation, aperture, notch, cut, groove, and slot formed on an edge of the electronics carrier (110).

Clause 19. The camera arrangement (100) of any preceding clause, wherein the conductive EMI-shielding (140) is provided with corresponding first and/or second projections (141*a*, 142*a*) extending along the optical axis (O) or parallel thereof and configured to be at least partially inserted into the opening (115, 116) formed in the electronics carrier (110).

Clause 20. The camera arrangement (100) of clause 19, wherein a gap is defined between at least one of:

i) the first projection (141*a*) and the second part (142) of the conductive EMI-shielding (140); and ii) the second projection (142*a*) and the first part (141) of the conductive EMI-shielding (140).

Clause 21. The camera arrangement (100) of clause 20, wherein a welding material (W) is provided in the gap such that, in use, the first projection (141*a*) and the second part (142) of the conductive EMI-shielding (140) and/or the second projection (142*a*) and the first part (141) of the conductive EMI-shielding (140) are electrically connected at least prior to the conductive EMI-shielding (140) is encapsulated within the outer shell (130).

Clause 22. The camera arrangement (100) of any clauses 1-21, wherein a lateral surface of the conductive EMI-shielding (140) comprises at least one opening (170) for receiving soldering material (S) for attaching the first and second parts (141, 142) of the conductive EMI-shielding (140) to the respective surfaces (111, 112) of the electronics carrier (110).

Clause 23. A method for making a camera arrangement (100) comprising:

preferably, attaching a lens assembly (160) and an electronics carrier (110) to each other so as to establish an optical communication between the lens assembly (160) and an image sensor (120);

providing a conductive EMI-shielding (140) comprising at least one passageway (150);

preferably, attaching the conductive EMI-shielding (140) and the electronics carrier (110) to each other such that conductive EMI-shielding (140) at least partially covers an electronics component (300) coupled to the electronics carrier (110);

inserting the electronics carrier (110), the conductive EMI-shielding (140), and at least a portion of the lens assembly (160) inside an injection mold;

injecting outer shell molding material inside the injection mold at pressure values up to 60 bar to form the outer shell (130), wherein the outer shell (130) is a one-single injection-molded part such that the electronics carrier (110) and the conductive EMI-shielding (140) are substantially encapsulated within the outer shell (130) so as to form a one-single over molded unit, wherein the injection process causes the molding material to flow through the at least one passageway (150) into the conductive EMI-shielding (140) such that the molding material at least directly contacts an inner surface of the EMI-shielding (140) and the electronics carrier (110); and removing the injection mold.

Clause 24. A method for making a camera arrangement (100) comprising:

preferably, attaching a lens assembly (160) and an electronics carrier (110) to each other so as to establish an optical communication between the lens assembly (160) and an image sensor (120);

providing a first part (141) and a second part (142) of a conductive EMI-shielding (140);

attaching the conductive EMI-shielding (140) and the electronics carrier (110) to each other, preferably by soldering material (S), such that conductive EMI-shielding (140) at least partially covers an electronics component (300) coupled to the electronics carrier (110);

attaching an electric line (144) and the conductive EMI-shielding (140) to each other, preferably by welding material (W), such that the first part (141) and the second part (142) are electrically connected to each other;

inserting the electronics carrier (110), the conductive EMI-shielding (140), and at least a portion of the lens assembly (160) inside an injection mold;

injecting outer shell molding material inside the injection mold at pressure values up to 60 bar to form the outer shell (130), wherein the outer shell (130) is a one-single injection-molded part such that the electronics carrier (110) and the conductive EMI-shielding (140) are substantially encapsulated within the outer shell (130) so as to form a one-single over molded unit; and removing the injection mold.

Clause 25. A method for making a camera arrangement (100) comprising:

providing an electronics carrier (110) comprising an opening (115, 116);

preferably, attaching a lens assembly (160) and the electronics carrier (110) to each other so as to establish an optical communication between the lens assembly (160) and an image sensor (120);

providing a first part (141) and a second part (142) of a conductive EMI-shielding (140); wherein the first part (141) comprises a first projection (141*a*) and/or the second part (142) comprises a second projection (142*a*) extending along the optical axis (O) or parallel thereof;

inserting at least partially the first projection (141*a*) and/or the second projection (142*a*) into the opening (115, 116) formed in the electronics carrier (110) such that, in use, a gap is defined between at least one of:

i) the first projection (141*a*) and the second part (142) of the conductive EMI-shielding (140); and ii) the second projection (142*a*) and the first part (141) of the conductive EMI-shielding (140);

providing welding material (W) in the gap such that, in use, the first projection (141*a*) and the second part (142) of the conductive EMI-shielding (140) and/or the second projection (142*a*) and the first part (141) of the conductive EMI-shielding (140) are electrically connected;

inserting the electronics carrier (110), the conductive EMI-shielding (140), and at least a portion of the lens assembly (160) inside an injection mold;

injecting outer shell molding material inside the injection mold at pressure values up to 60 bar to form the outer shell (130), wherein the outer shell (130) is a one-single injection-molded part such that the electronics carrier (110) and the conductive EMI-shielding (140) are substantially encapsulated within the outer shell (130) so as to form a one-single over molded unit; and removing the injection mold.

What is claimed is:

1. A camera arrangement comprising;

an electronics carrier supporting electronic components, an image sensor connected to the electronics carrier;

a lens assembly in optical communication with the image sensor along an optical axis;

an outer shell that is a one-single injection-molded part over and around the electronics carrier such that the electronics carrier is substantially encapsulated within the outer shell; and a conductive electromagnetic interference shielding (conductive EMI-shielding) substantially encapsulated within the outer shell, and wherein the conductive EMI-shielding comprises an electrically conductive sheet that at least partially covers the image sensor, and wherein the conductive EMI-shielding is configured to create a barrier for preventing electromagnetic fields from interfering with the image sensor and the electronic components, wherein the conductive EMI-shielding forms a cavity for receiving the image sensor and the electronics carrier, wherein the conductive EMI-shielding comprises a first part and a second part electrically connected to each other, and wherein the image sensor and the electronics carrier are arranged between the first part and the second part.

2. A camera arrangement comprising;

an electronics carrier, an image sensor connected to the electronics carrier, a lens assembly in optical communication with the image sensor along an optical axis, an outer shell that is a one-single injection-molded part over and around the electronics carrier such that the electronics carrier is substantially encapsulated within the outer shell; and a conductive EMI-shielding substantially encapsulated within the outer shell, wherein the conductive EMI-shielding comprises at least one passageway through which molding material of the outer shell is allowed to flow into the conductive EMI-shielding during an injection molding process to form a one-single over molded unit.

3. The camera arrangement of claim 2, wherein a cross-sectional area of the passageway is 0.7-12 mm2.

4. The camera arrangement of claim 2, wherein the conductive EMI-shielding and the electronics carrier are attached to each other, preferably, by soldering material.

5. The camera arrangement of claim 2, wherein the conductive EMI-shielding comprises a first part and a second part electrically connected to each other, and wherein the camera arrangement comprises an electric line configured to electrically connect the first part and the second part to each other.

6. The camera arrangement of claim 5, wherein the electric line and the conductive EMI-shielding are attached to each other through welding material.

7. A camera arrangement comprising;

an electronics carrier, an image sensor connected to the electronics carrier, a lens assembly in optical communication with the image sensor along an optical axis, an outer shell that is a one-single injection-molded part over and around the electronics carrier such that the electronics carrier is substantially encapsulated within the outer shell; and a conductive EMI-shielding substantially encapsulated within the outer shell, wherein the conductive EMI-shielding comprises a first part and a second part electrically connected to each other, and wherein the camera arrangement comprises an electric line configured to electrically connect the first part and the second part to each other; and wherein the electronics carrier comprises a first interface portion formed on at least one respective opposite surface, wherein the camera arrangement further comprises a first conductive track electrically connecting at least one electronic component to the first interface portion, such that, in use, the second part is electrically connected to the first part of the conductive EMI-shielding, the conductive EMI-shielding being electrically connected to the electronics carrier through at least the first interface portion.

8. A camera arrangement comprising;

an electronics carrier, an image sensor connected to the electronics carrier, a lens assembly in optical communication with the image sensor along an optical axis, an outer shell that is a one-single injection-molded part over and around the electronics carrier such that the electronics carrier is substantially encapsulated within the outer shell; and a conductive EMI-shielding substantially encapsulated within the outer shell; and wherein the conductive EMI-shielding comprises a first part and a second part electrically connected to each other, and wherein the camera arrangement comprises an electric line configured to electrically connect the first part and the second part to each other;

wherein electronics carrier defines an opening, wherein the electric line at least partially runs through the opening.

9. The camera arrangement of claim 8, wherein the conductive EMI-shielding is provided with corresponding at least one of a first projection and a second projection extending along the optical axis or parallel thereof and configured to be at least partially inserted into the opening formed on the electronics carrier such that a gap is defined between at least one of:

(i) the first projection and the second part of the EMI-shielding; and (ii) the second projection and the first part of the EMI-shielding;

wherein the gap is configured to receive therein a welding material such that, in use, the first projection and the second part and/or the second projection and the first part are electrically connected at least prior to the conductive EMI-shielding is substantially encapsulated within the outer shell.

10. The camera arrangement of claim 9, wherein the opening comprises at least one of an indentation, an aperture, a notch, a cut, a groove, and a slot formed on an edge of the electronics carrier, and wherein the first projection and the second projection are at least substantially aligned along or parallel with the optical axis.

11. A camera arrangement comprising;

an electronics carrier, an image sensor connected to the electronics carrier, a lens assembly in optical communication with the image sensor along an optical axis, an outer shell that is a one-single injection-molded part over and around the electronics carrier such that the electronics carrier is substantially encapsulated within the outer shell; and a conductive EMI-shielding substantially encapsulated within the outer shell;

wherein the conductive EMI-shielding comprises a first part and a second part electrically connected to each other, and wherein the camera arrangement comprises an electric line configured to electrically connect the first part and the second part to each other; and wherein a lateral surface of the conductive EMI-shielding comprises at least one opening for receiving soldering material so as to attach the second part to the electronics carrier.

12. A camera arrangement comprising;

an electronics carrier, an image sensor connected to the electronics carrier, a lens assembly in optical communication with the image sensor along an optical axis, and an outer shell that is a one-single injection-molded part over and around the electronics carrier such that the electronics carrier is substantially encapsulated within the outer shell; and a heater element for resistive heating of the lens assembly, the heater element comprising a sheet material with electrical resistance configured to be arranged at least partially surrounding the lens assembly wrapping an outer side surface thereof for removing any water-based obstructions that may be attached to the lens assembly as an electric current flows there through.

13. A method for making a camera arrangement, the method comprising:

inserting an electronics carrier and at least a portion of a lens assembly inside an injection mold;

inserting a first part and a second part of a conductive EMI-shielding inside the injection mold;

attaching the conductive EMI-shielding and the electronics carrier to each other such that conductive EMI-shielding at least partially covers an electronics component coupled to the electronics carrier; and electrically connecting the first part and the second part of the conductive EMI-shielding to each other;

injecting outer shell molding material to form an outer shell encapsulating the electronics carrier within the outer shell, the outer shell surrounding at least partially a portion of the lens assembly so as to form a one-single over molded unit; and removing the injection mold.

14. The method of claim 13, wherein electrically connecting the first part and the second part of the conductive EMI-shielding to each other comprises attaching an electric line and the conductive EMI-shielding to each other, wherein attaching the conductive EMI-shielding and the electronics carrier to each other is made by soldering material, and wherein attaching the electric line and the conductive EMI-shielding to each other is made by welding material.

15. A method for making a camera arrangement, the method comprising:

inserting an electronics carrier and at least a portion of a lens assembly inside an injection mold;

inserting a first part and a second part of a conductive EMI-shielding inside the injection mold; wherein the first part comprises at least one of a first projection and the second part comprises a second projection extending along an optical axis or parallel thereof;

inserting at least partially the at least one of the first projection and the second projection into an opening formed in the electronics carrier such that, in use, a gap is defined between at least one of:

i) the first projection and the second part of the conductive EMI-shielding, and ii) the second projection and the first part of the conductive EMI-shielding; and providing welding material in the gap such that, in use, the first projection and the second part of the conductive EMI-shielding and/or the second projection and the first part of the conductive EMI-shielding are electrically connected;

injecting outer shell molding material to form an outer shell encapsulating the electronics carrier within the outer shell, the outer shell surrounding at least partially a portion of the lens assembly so as to form a one-single over molded unit; and removing the injection mold.

* * * * *